United States Patent
Buchhagen

(10) Patent No.: US 12,215,751 B2
(45) Date of Patent: Feb. 4, 2025

(54) FLAT FORM SPRING, IN PARTICULAR DISC OR WAVE SPRING

(71) Applicant: CHRISTIAN BAUER GMBH + CO. KG, Welzheim (DE)

(72) Inventor: Peter Buchhagen, Schorndorf (DE)

(73) Assignee: CHRISTIAN BAUER GMBH + CO. KG, Welzheim (DE)

( * ) Notice: Subject to any disclaimer, the term of this patent is extended or adjusted under 35 U.S.C. 154(b) by 108 days.

(21) Appl. No.: 16/819,084

(22) Filed: Mar. 14, 2020

(65) Prior Publication Data
US 2020/0292022 A1   Sep. 17, 2020

(30) Foreign Application Priority Data
Mar. 15, 2019   (DE) .................... 10 2019 203 558.2

(51) Int. Cl.
| | |
|---|---|
| *F16F 1/02* | (2006.01) |
| *C22C 38/04* | (2006.01) |
| *C22C 38/44* | (2006.01) |
| *C22C 38/46* | (2006.01) |
| *C22C 38/48* | (2006.01) |

(Continued)

(52) U.S. Cl.
CPC ............. *F16F 1/021* (2013.01); *C22C 38/04* (2013.01); *C22C 38/44* (2013.01); *C22C 38/46* (2013.01); *C22C 38/48* (2013.01); *C22C 38/50* (2013.01); *F16F 1/328* (2013.01); *F16F 2224/0208* (2013.01); *F16F 2224/0258* (2013.01)

(58) Field of Classification Search
None
See application file for complete search history.

(56) References Cited

U.S. PATENT DOCUMENTS

2006/0182379 A1   8/2006   Grell

FOREIGN PATENT DOCUMENTS

| CN | 103614634 A | 3/2014 |
|---|---|---|
| CN | 107557671 A | 1/2018 |
| DE | 1508392 A1 | 10/1969 |

(Continued)

OTHER PUBLICATIONS

English language machine translation of JP-04247824-A to Koyasu et al. Generated Apr. 23, 2022. (Year: 2022).*

(Continued)

*Primary Examiner* — Brian D Walck
(74) *Attorney, Agent, or Firm* — Ewers IP Law PLLC; Falk Ewers

(57) ABSTRACT

A flat form spring, in particular a disc spring or corrugated spring, includes a spring body made of a low-alloy steel which has a carbon content of more than 0.35% by weight and at most 0.75% by weight. The steel contains between 0.3 wt. % and 0.9 wt. % manganese (Mn) as an alloying element. The steel also contains chromium (Cr) as an alloying element with a weight proportion of between 0.3 wt. % and 1.5 wt. %. The steel further contains between 0.1% and 0.6% by weight of molybdenum (Mo) as an alloying element. In addition, the steel contains more than 0.4 wt. % and up to 8 wt. % nickel (Ni) as an alloying element. A flatform spring made in this way has an improved strength compared to conventional flatform springs without a loss of toughness compared to a spring made of conventional spring steels.

18 Claims, 1 Drawing Sheet

(51) Int. Cl.
*C22C 38/50* (2006.01)
*F16F 1/32* (2006.01)

(56) References Cited

FOREIGN PATENT DOCUMENTS

| DE | 10333875 A1 | | 2/2005 |
|----|----|----|----|
| GB | 1114520 A1 | | 11/1966 |
| JP | S55-152934 A | | 11/1980 |
| JP | 04247824 A | * | 9/1992 |
| JP | 2008223043 A | * | 9/2008 |
| JP | 2016113671 A | * | 6/2016 |

OTHER PUBLICATIONS

English language machine translation of JP-2016113671-A to Iwagaki et al. Generated Apr. 23, 2022 (Year: 2022).*

"Hardness Conversion Table." Stal & Metaller. https://www.bbshalmstad.se/en/infocenter/hardness-conversion-table/. Accessed Apr. 23, 2022 (Year: 2022).*

Designing Buildings The Construction Wiki. https://www.designingbuildings.co.uk/wiki/Flat_springs. Relevant portion written Nov. 15, 2017. (Year: 2017).*

Zeiler et al. "Recycling of tungsten: Current share, economic limitations, technologies and future potential." International Jouranl of Refractory Metals and Hard Materials 98 (2021). pp. 1-25. (Year: 2021).*

English language machine translation of JP-2008223043-A. Generated Feb. 2, 2024. (Year: 2024).*

Office Action issued in Chinese Counterpart Patent Application No. CN 202010181148.5 dated Maerch 24, 2022 and English language machine translation thereof.

* cited by examiner

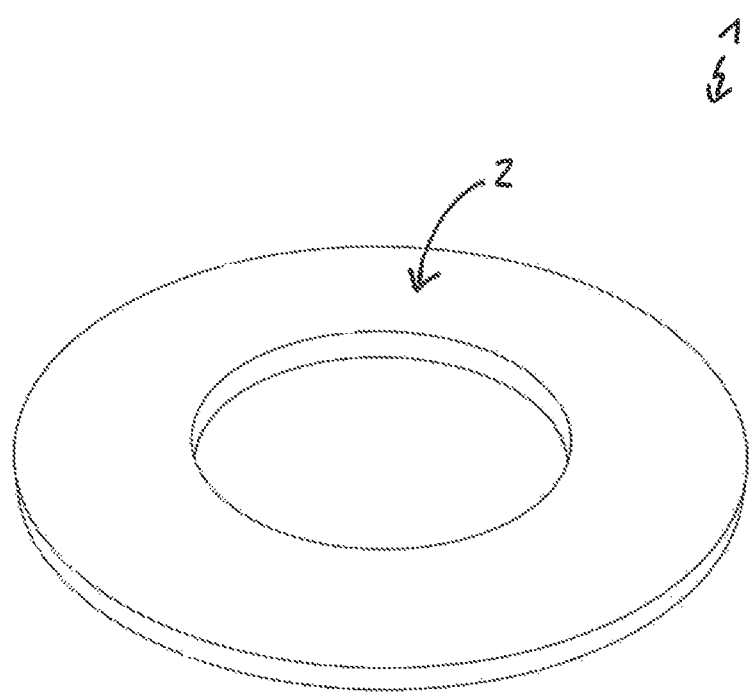

FLAT FORM SPRING, IN PARTICULAR DISC OR WAVE SPRING

CROSS REFERENCE TO RELATED APPLICATIONS

This application claims priority to German patent application DE 10 2019 203 558.2, filed Mar. 15, 2019, the entire content of which is incorporated herein by reference.

TECHNICAL FIELD

The disclosure relates to a flat form spring, in particular a plate or corrugated spring.

BACKGROUND

Flat form springs are typically made of a standardized material, the so-called flat material. For the shaping of the springs, the so-called embossing, a sufficient deformability of the material used is required. After the forming process, the springs are tempered to produce the desired spring elastic properties.

The DIN standard DIN EN 10132-4 offers a selection of mostly hypoeutectoid steels, carbon steels and low-alloy steels of the groups Si to CrV as suitable materials for flatform springs. In order to increase the performance of flat springs, especially with regard to load capacity, relaxation resistance and dynamic service life, the springs can be quenched and tempered with greater strength, hot pre-treated and provided with special surface properties—for example by shot peening, smoothing, or deep rolling.

However, the measures mentioned above cannot be combined at will, since, for example, higher strength leads to higher load capacity, but also to a reduced service life due to the embrittlement associated with conventional factory processes.

SUMMARY

It is an object of the present disclosure to provide new ways in the development of flatform springs. In particular, the aim is to create a flat form spring with improved strength without limiting toughness.

The object is achieved by a flat form spring as described herein.

According to an aspect of the disclosure, the platform spring is made of a low-alloy steel with the alloying elements manganese (Mn), chromium (Cr), vanadium (V), molybdenum (Mo), and nickel (Ni), the alloying elements being contained in specific proportions by weight.

Experimental investigations have shown that the essential spring properties such as fatigue strength, service life, relaxation resistance and load-bearing capacity can be significantly improved with a flatform spring of this design. In particular, flat springs with a strength of up to 2100 MPa can be made technically usable with the material composition according to an aspect of the disclosure.

A flat form spring according to an aspect of the disclosure, in particular a disc spring or corrugated spring, includes a spring body made of a low-alloy steel which has a carbon content of more than 0.35 wt. % and at most 0.75 wt. %. According an aspect of the disclosure, the steel contains between 0.3 wt. % and 0.9 wt. % manganese as an alloying element. In accordance with an aspect of the disclosure, the steel also contains chromium as an alloying element with a proportion by weight of between 0.3 and 1.5% by weight. In accordance with an aspect of the disclosure, the steel also contains between 0.1 wt. % and 0.6 wt. % molybdenum as an alloying element. In addition, in accordance with an aspect of the disclosure, the steel also contains more than 0.4 wt. % and up to 8 wt. % nickel as an alloying element.

In the flat form spring according to an aspect of the disclosure, its spring properties can be positively influenced by introducing suitable residual compressive stresses by shot peening, smooth rolling, or deep rolling.

In an exemplary embodiment, the weight proportion of the steel not formed by the alloying elements is formed by iron (Fe). With regard to their contribution to the total weight of the steel, the alloying elements are supplemented by iron to form the steel. In addition to the iron and the alloying elements, the steel may also contain a small amount of impurities, which, however, typically contribute to the total weight of the steel with not more than 0.1% by weight.

According to an exemplary embodiment, the weight percentage of all alloying elements in the steel is at most 5 weight %, typically at most 3.7 weight %.

According to another exemplary embodiment, the flat form spring contains at least one of the following components as an alloying element: vanadium (V), titanium (Ti), tungsten (W), and niobium (Nb).

According to another exemplary embodiment, the steel contains at least one of the following alloying elements: vanadium (V), titanium (Ti), tungsten (W), and niobium (Nb). In this form, a (first) qualified sum (S1) of the weight percentage of these alloying elements (V, Ti, W, and Nb) and of the chromium (Cr), which is also necessarily present in the steel, is formed by the sum of the weight percentage of chromium (Cr) and three times the weight percentage of the other four said alloying elements (V, Ti, W, and Nb), if these are present in the steel. If one, two or three of said four alloying elements vanadium (V), titanium (Ti), tungsten (W), and niobium (Nb) are not present in the steel in this form, they are not taken into account in the calculation of the (first) qualified sum (S1), i.e., their weight proportion is assumed to be 0 wt. %. In this exemplary embodiment form, the (first) qualified sum (S1) is between 0.3% and 1.5% by weight, typically between 0.4% and 0.7% by weight, According to another exemplary embodiment, the steel contains between 0.1% and 0.3% by weight of molybdenum as an alloying element. With the aid of molybdenum, improved through-hardenability can be achieved in the steel. In addition, a particularly good low-temperature toughness can be achieved. However, due to the tendency to form special carbides at higher molybdenum contents, this alloying element should be limited to the above-mentioned range of 0.1 wt. % to 0.6 wt. %, typically 0.1 wt. % to 0.3 wt. %.

The alloying element nickel significantly improves the toughness of high-strength steels up to a concentration of 8% by weight. In order to be able to make a significant contribution to the increase in toughness, it is suggested, in accordance with an exemplary embodiment, that the nickel content should be more than 0.4 wt. %. Typically, the nickel content is in the range of 0.4 wt. % to 2 wt. %, typically in the range of 0.5 wt. % to 1 wt. %.

The alloying element silicon causes an undesirable high sensitivity of the steel to decarburisation during quenching and tempering and must therefore be limited. According to another exemplary embodiment of the present disclosure, the steel of the flatform spring therefore contains at most 0.3 wt. % silicon as an alloying element.

According to a further exemplary embodiment, it proves to be particularly advantageous with regard to the achieved toughness and with regard to the achieved (permanent)

strength, if the remaining weight proportion of austenite is between 2% and 10%, in particular between 2% and 5%. In accordance with another exemplary embodiment, a (second) qualified sum (S2) is calculated from the weight proportions of the alloying elements silicon (Si), manganese (Mn), chromium (Cr), nickel (Ni), tungsten (W), vanadium (V), titanium (Ti), niobium (Nb), and molybdenum (Mb) as follows:

$$S2=Si+Mn+Cr+Ni+W+(V+Ti+Nb-Mo)*3).$$

In this exemplary embodiment, the (second) qualified sum (S2) is less than 3% by weight, typically less than 2% by weight.

For reasons of cost, the flatform spring of the disclosure does not provide for the addition of a larger quantity of cobalt to the steel, but this is possible and technically advantageous. With a maximum cobalt content of 0.1% by weight, the desired positive spring properties can be achieved while at the same time achieving not inconsiderable cost advantages in the manufacture of the flatform spring.

According to a further exemplary embodiment, the low-alloy steel is quenched and tempered, typically bainitic quenched and tempered.

The steel of the flatform spring is typically quenched and tempered to a strength of more than 1700 MPa, which, due to the loss of toughness, leads to a high probability of breakage and low fatigue strength, service life and poor relaxation resistance in conventional spring steels.

According to a further exemplary embodiment, the carbon content of the steel is more than 0.55% by weight. The carbon contained in the steel has a direct effect on the hardenability of the steel—in particular on its temperability and solid solution hardening—and should therefore be contained in the low-alloy steel of the flatform spring presented here with a weight content of more than 0.55 wt. %. However, in view of the precipitation of special carbides, which is undesirable for the flatform spring presented here, the carbon content must not exceed 0.75 wt. % in this exemplary embodiment.

It is understood that the features mentioned above and the features to be explained below can be used not only in the combination indicated in each case, but also in other combinations or on their own, without leaving the scope of the present disclosure.

BRIEF DESCRIPTION OF THE DRAWINGS

The disclosure will now be described with reference to the drawing wherein:

FIG. 1 shows a schematic sectional view of a flat form spring 1, which is realized as a disc spring according to an exemplary embodiment of the disclosure. Other forms of flatform spring 1 are also conceivable, such as a wave spring not shown in FIG. 1.

DESCRIPTION OF EXEMPLARY EMBODIMENTS

The flat shaped spring 1 configured as a disc spring includes a spring body 2 made of a low-alloy steel, which has a carbon content of more than 0.35% by weight and at most 0.75% by weight. The weight proportion of all alloying elements is at most 5 weight %, in a typical variant at most 3.7 weight %.

In the exemplary embodiment shown in FIG. 1, the steel contains between 0.3 wt. % and 0.9 wt. % manganese (Mn) as an alloying element. In the example exemplary embodiment shown in FIG. 1, the steel also contains chromium (Cr) as an alloying element. Chromium (Cr) is present in a proportion by weight of between 0.3% and 1.5%. In addition, the steel contains between 0.1% and 0.6% by weight of molybdenum (Mo) as an alloying element. Furthermore, the steel contains more than 0.1 wt. % and up to 8 wt. % nickel (Ni) as an alloying element. The weight proportion of the steel not formed by the alloying elements is formed by iron (Fe). In addition to the iron and the alloying elements, the steel may also contain a small amount of impurities, which, however, contribute to the total weight of the steel by not more than 0.1% by weight.

The weight proportion of all alloying elements of the low-alloy steel is expediently at most 5 wt. %, typically at most 3.7 wt. %. Typically, the carbon content of the steel is more than 0.55% and at most 0.75% by weight.

Furthermore, the steel may contain at least one of the alloying elements vanadium (V), titanium (Ti), tungsten (W) and niobium (Nb). In this variant, a (first) qualified sum (S1) of the percentage by weight (in % by weight) of these alloying elements (V, Ti, W, and Nb) and of the chromium (Cr) which is also necessarily present in the steel is formed by the sum of the percentage by weight of chromium (Cr) and three times the percentage by weight of the other four said alloying elements (V, Ti, W, and Nb), if these are present in the steel. If one, two or three of the said four alloying elements vanadium (V), titanium (Ti), tungsten (W), and niobium (Nb) are not present in the steel in this variant, they are not taken into account in the calculation of the (first) qualified sum (S1), i.e., their weight proportion is assumed to be 0 wt. %. In this variant, the (first) qualified sum (S1) is between 0.3 wt. % and 1.5 wt. %, typically between 0.4 wt. % and 0.7 wt. %.

The steel contains typically between 0.1 wt. % and 0.6 wt. % molybdenum (Mo) and/or between 0.5 wt. % and 1 wt. % nickel (Ni) as alloying elements.

Optionally, the steel may contain at most 0.3 wt. % silicon (Si) as an alloying element.

Typically, a (second) qualified sum (S2) is calculated from the weight percentages of the alloying elements silicon (Si), manganese (Mn), chromium (Cr), nickel (Ni), tungsten (W), vanadium (V), titanium (Ti), niobium (Nb), and molybdenum (Mb) as follows: S2=Si+Mn+Cr+Ni+W+(V+Ti+Nb−Mo)*3). In this variant, the (second) qualified sum (S2) is less than 3% by weight, typically less than 2% by weight. The remaining or missing parts by weight of the spring body are expediently formed by iron (Fe) and production-related impurities.

Optionally, the steel can contain cobalt as an alloying element, but at most with some 0.1 wt. %. The steel must be suitably quenched and tempered and typically contains no pearlite. The low-alloy steel is typically for bainitic quenching and tempering. Typically the strength of the steel is more than 1700 MPa. The surface has a surface roughness Ra of less than 0.8 μm at least in sections, typically completely. This surface roughness Ra can typically be achieved by polishing the relevant surfaces of the flatform springs.

The spring properties of the flatform spring presented here can be further improved by introducing suitable residual compressive stresses by shot peening, smooth rolling or deep rolling.

It is understood that the foregoing description is that of the exemplary embodiments of the disclosure and that various changes and modifications may be made thereto without departing from the spirit and scope of the disclosure as defined in the appended claims.

What is claimed is:

1. A flat form spring comprising:
a spring body made of a low-alloy steel including:
between 0.65% by weight and 0.7% by weight of carbon,
between 0.35% and 0.5% by weight of manganese,
between 0.45% and 0.6% by weight of chromium,
between 0.15% and 0.25% by weight of molybdenum,
between 0.55% by weight and 0.75% by weight of nickel,
between 0% by weight and less than 0.2% by weight of tungsten, iron,
between 0.2% by weight and 0.35% by weight of silicon,
between 0% by weight and 0.025% by weight of phosphorus,
between 0% by weight and 0.05% by weight of sulfur,
between 0% by weight and less than 0.05% per weight of aluminum,
between 0% by weight and less than 0.25% per weight of copper, and
wherein the low-alloy steel is bainitic quenched and tempered.

2. The flat form spring according to claim 1, wherein the low-alloy steel contains between 0.4% and 0.7% by weight of chromium.

3. The flat form spring according to claim 1, wherein the flat form spring is a disc spring or a corrugated spring.

4. The flat form spring according to claim 1, wherein a weight proportion of the low-alloy steel not formed by alloying elements is formed by the iron, the carbon, and fusion-related impurities.

5. The flat form spring according to claim 1, wherein a weight percentage of alloying elements is more than 1% by weight and not more than 5% by weight of the low-alloy steel.

6. The flat form spring according to claim 1, wherein a weight percentage of alloying elements is more than 1% by weight and not more than 3.7% by weight of the low-alloy steel.

7. The flat form spring according to claim 1, wherein the flatform spring contains at least one of vanadium, titanium, and niobium as alloying elements.

8. The flat form spring according to claim 1, wherein:
the low-alloy steel contains at least one of vanadium, titanium, tungsten, and niobium as alloying elements,
a first qualified sum of a weight proportion in % by weight of the at least one of the vanadium, the titanium, the tungsten, and the niobium and of the chromium in the low-alloy steel is formed by a sum of the weight proportion of the chromium and three times the weight proportion of the at least one of the vanadium, the titanium, the tungsten, and the niobium, when the at least one alloying element is present in the low-alloy steel, and
the first qualified sum is between 0.3% and 1.5% by weight.

9. The flat form spring according to claim 8, wherein the first qualified sum is between 0.4% and 0.7% by weight.

10. The flat form spring according to claim 1, wherein the low-alloy steel contains between 0.1% and 0.3% by weight of molybdenum.

11. The flat form spring according to claim 1, wherein the low-alloy steel contains between 0.4% and 2% by weight of nickel.

12. The flat form spring according to claim 1, wherein the low-alloy steel contains between 0.5% and 1% by weight of nickel.

13. The flat form spring according to claim 1, wherein the low-alloy steel contains vanadium, and/or titanium, and/or niobium in each case with a weight proportion (x) of 0<x<0.2% by weight.

14. The flat form spring according to claim 1, wherein the low-alloy steel contains vanadium, and/or titanium, and/or niobium, in each case with a weight proportion (x) of 0<x<0.1% by weight.

15. The flat form spring according to claim 1, wherein:
a second qualified sum is calculated from weight percentages in % by weight of the silicon, manganese, chromium, nickel, tungsten, vanadium, titanium, niobium, and molybdenum as follows:

$$S2=Si+Mn+Cr+Ni+W+(V+Ti+Nb-Mo)*3),\text{ and}$$

the second qualified sum is less than 3% by weight.

16. The flat form spring according to claim 10, wherein the second qualified sum is less than 2% by weight.

17. The flat form spring according to claim 1, wherein the low-alloy steel is quenched and tempered to a strength of more than 1700 MPa.

18. The flat form spring according to claim 1, wherein the carbon of the low-alloy steel is more than 0.55% by weight.

* * * * *